Oct. 12, 1965 G. L. ALLERTON ETAL 3,211,999
METHOD AND APPARATUS FOR MEASURING SEMICONDUCTOR VOLUME
RESISTIVITY BY TRANSMISSION LOSS IN A RESONANT CAVITY
Filed April 27, 1960 5 Sheets-Sheet 1

INVENTORS
G. L. ALLERTON
J. R. SEIFERT
By S. Gundersen
ATTORNEY

INVENTORS
G.L. ALLERTON
J.R. SEIFERT
By S. Gundersen
ATTORNEY

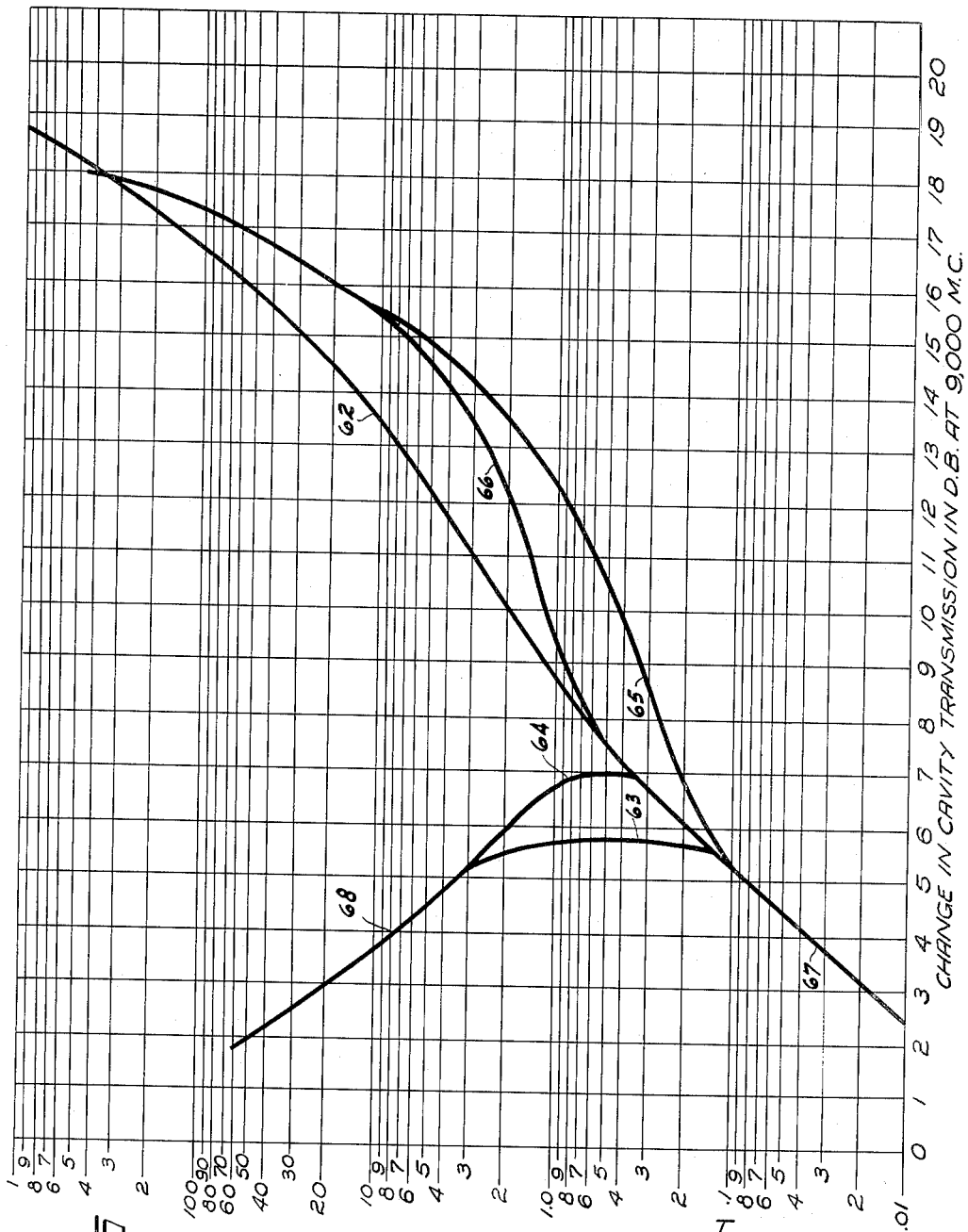

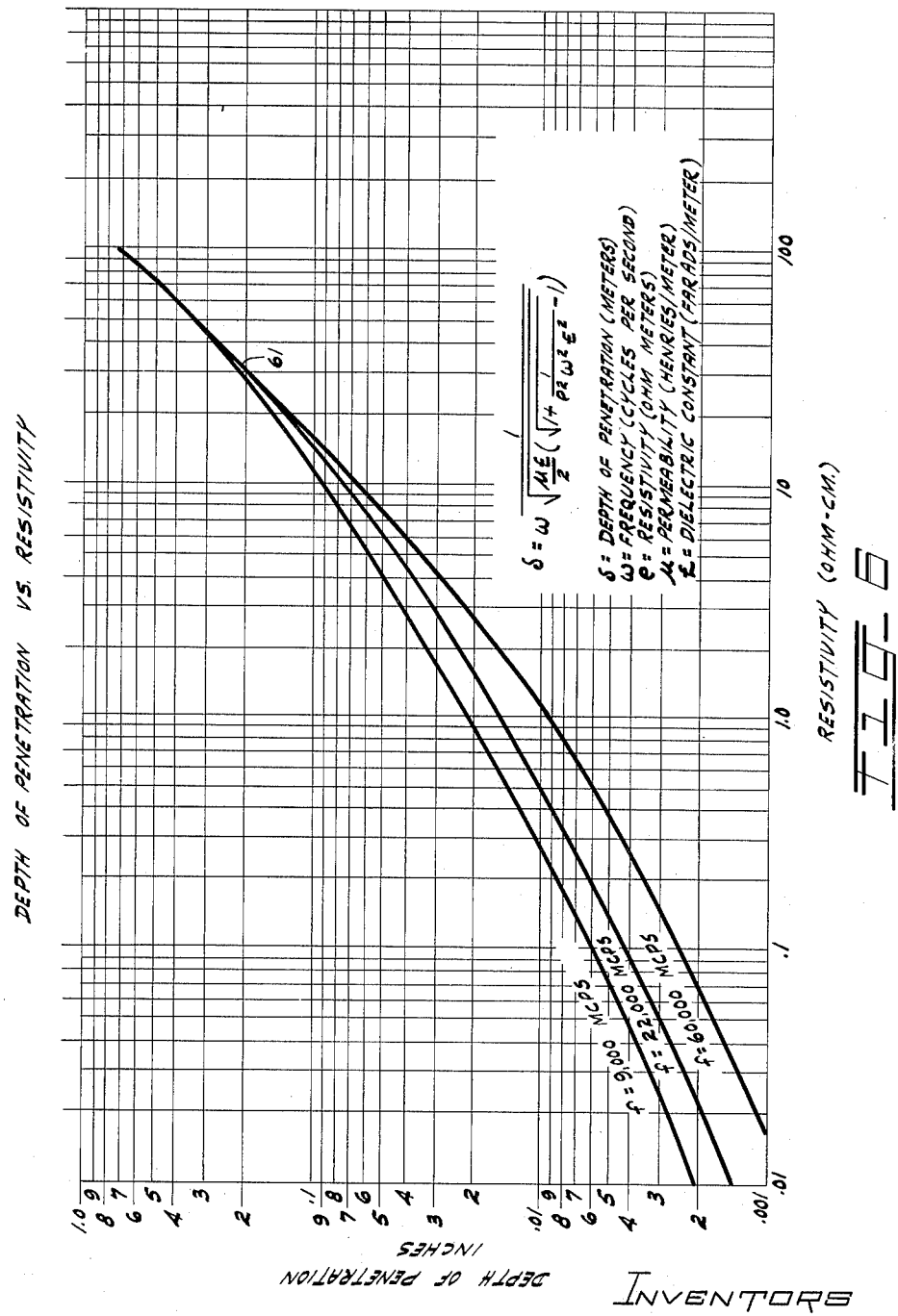

3,211,999
METHOD AND APPARATUS FOR MEASURING SEMICONDUCTOR VOLUME RESISTIVITY BY TRANSMISSION LOSS IN A RESONANT CAVITY

George L. Allerton, Orefield, and James R. Seifert, Bethlehem, Pa., assignors to Western Electric Company, Incorporated, New York, N.Y., a corporation of New York Filed Apr. 27, 1960, Ser. No. 24,949
6 Claims. (Cl. 324—62)

This invention relates to the testing of electrical resistivity and particularly to methods of and apparatus for determining resistivities of semiconductor materials.

In the fabrication of semiconductor material for electrical devices, such as transistors and diodes, measurement of the resistivity of the material is an essential and crucial undertaking since the eventual circuit properties of the devices are largely determined by this parameter. Heretofore a technique known as the four-point probe method has been widely applied to this measurement. As used in both volume and sheet resistivity measurements, the four-point probe method entails establishing simultaneous point contacts at a surface of the material under test with four spaced-apart probes. A current is then caused to flow between two of the probes, and voltage readings for the remaining two probes determined. The functional relationships between the voltages and currents for various geometries of semiconductor configuration and probe placement permit the determination of resistivity.

While the four-point method may have particular advantages in certain situations, for example in laboratory investigations of field distributions in semiconductor bodies, it has advantages in application to production testing. Probably the most significant of these disadvantages is the necessity of establishing a physical contact between the material under test and the probes. This physical contact is inevitably destructive to some extent of the tested body. Another consequence is the introduction of impurities contained either on the probe surface or as an impurity in the probe material. The disadvantages are compounded when a pattern of multiple tests are undertaken according to one advanced technique and by the necessity of precisely positioning the probes. Minimizing these effects requires expenditures in time and applications of sophisticated control devices and techniques which add considerably to production expenses. Directly linked to the need for greater care and more complex test equipment is an increase in labor cost.

However, even with the minimization of material damaging effects discussed above, the four-point probe method has other shortcomings. Frequently, it is desirable to determine the resistivity of a surface layer independently of the resistivity of deeper layers of the material. Such sheet resistivity measurements are particularly difficult to obtain with the point probes and they are speculative when obtained due to the difficulty of analyzing the field distribution. Solutions to this problem depend upon complex functions which are inconvenient to apply to practical manufacturing set-ups.

It is, therefore, an object of the invention to provide accurate and speedy methods of and apparatus for measuring the resistivity of materials.

A further object is to provide semiconductor resistivity measuring apparatus which eliminates the necessity for point contacts between test probes and the material under test.

An additional object is to provide methods of and apparatus for measuring resistivity to a given depth in the test sample.

According to the invention, a high frequency test signal is supplied to a high Q resonant cavity having an aperture therein at a point of substantially uniform and high current density. A sample of semiconductor material is placed over the aperture. The transmission loss through the cavity is then measured and the resistivity of the sample determined from known resistivity versus loss characteristics.

The invention will be more readily understood from the following detailed description taken in conjunction with the accompanying drawing in which:

FIG. 1 s a circuit diagram illustrating apparatus for testing the sample as a termination of a transmission line in accordance with this invention;

FIGS. 4, 5 and 6 are graphs depicting the relation of transmission characteristics to resistivity for several embodiments of the invention.

Figure 1:
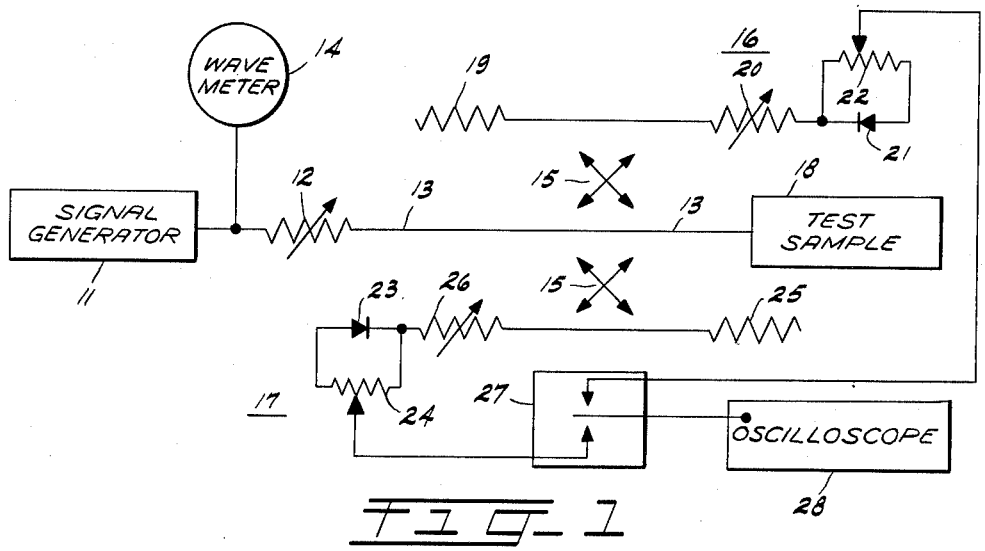

Referring now to the drawing, FIG. 1 illustrates one embodiment of the invention which, like all other embodiments, eliminates entirely the problems of the four-point probe method deriving from physical contact between the probes and the sample under test. Furthermore, as will be subsequently explained in detail, rapid and accurate resistivity measurements of thin sliced low resistivity material are obtainable by this and other embodiments without measuring material thickness. In addition, selected pinpoint areas of the sample surface can be effectively tested by the invention to an extent impossible with the four-point probe. These advantages are accomplished in the arrangement of FIG. 1 by terminating a transmission line either entirely with the test sample or with a combination of test sample and conductive material. A high frequency signal transmitted through the line is reflected in a characteristic way and from this reflected signal the sample resistivity is determined.

In FIG. 1 a signal generator 11 feeds a high frequency signal, which may be advantageously in the 8,000 to 65,000 megacycle range, through atteunator 12 into transmission line 13. Wave meter 14 at the output of generator 11 measures the output frequency of the signal. Connected in line 13 is directional coupler 15, a four terminal hybrid junction which by virtue of impedance relationships diverts portions of signals in line 13 either into an upper monitor circuit indicated generally as 16 or a lower monitor circuit indicated as 17. Both monitor circuits are similarly arranged circuit-wise although by virtue of the directional characteristics of coupler 15 they are impressed with different signals: circuit 16 with the incident signal from the generator as modified by attenuator 12, and circuit 17 with the signal reflected by the line terminating test sample 18.

Monitor circuit 16 has balancing impedance 19 for establishing the proper matching with directional coupler 15 to cause the incident or input signal from the signal generator 11 to enter the circuit. On the other side of the coupler 15 from impedance 19 in monitor circuit 16, variable attenuator 20 is connected in series with diode detector 21. In parallel with diode 21 is potentiometer 22 which serves to compensate for the differences in operating characteristics between diode 21 in monitor circuit 16 and diode 23 in monitor circuit 17. Potentiometer 24 in monitor circuit 17 serves a similar balancing function.

Balancing impedance 25 and variable attenuator 26 in monitor circuit 17 are analogous to attenuator 20 and impedance 19 but are in a position relative to the directional coupler to cause the reflected signal from test sample 18 to appear in circuit 17. The outputs of circuits 16 and 17 are taken from the respective potentiometers 22 and 23 to opposing contacts of switch 27. As a matter of convenience switch 27 is electrically operated to switch oscilloscope 28 from the output of circuit 16 to that of circuit 17 at a 30-cycle per second rate so that both outputs appear simultaneously on the oscilloscope screen.

Utilization of the apparatus of FIG. 1 will now be described. Signal generator 11 is selected to operate at 9,000 megacycles which will require a rectangular wave guide functioning as the transmission line 13 to have inside dimensions of 0.400 x 0.900 inch. With the test sample 18 placed across the entire open end of the wave guide thus terminating it, an equal area will be tested. This area may be reduced if desired by providing a highly conductive terminal wall with an aperture of the dimensions desired to be tested, into which the sample is inserted.

The penetration depth of the signal into the sample is a function of the frequency and resistivity of the material. As shown in FIG. 6, a reduction in penetration accompanies an increase in signal frequency to a resistivity of approximately 12 ohm-centimeters at converging point 61. Increasing the frequency also reduces the dimensions of the wave guide and, thereby, the area covered by the test when the sample covers the entire cross section of the wave guide. With proper selection of the test signal frequency, the factors of sheet depth and area may be chosen to the best advantage. Indeed, the resistivity can be measured accurately without measuring the thickness of the sample. In those situations where the sample may be any thickness, thicker, thinner, or the same as the penetrating depth, a method of backing the sample has been devised as a feature of this invention to eliminate ambiguity, which will be described hereinafter. At 9,000 megacycles, the depth of signal penetration will be related to the material resistivity as follows:

| Material resistivity (ohm-cm.): | Penetration depth (inches) |
| --- | --- |
| 0.01 | 0.0021 |
| 0.1 | 0.0066 |
| 1.0 | 0.021 |
| 10.0 | 0.087 |
| 100.0 | 0.726 |

It is convenient to measure the characteristics of the sample in the apparatus of FIG. 1 by determination of the reflection coefficient of the termination. A perfect conductor as a termination has a reflection coefficient of one, while increasing resistivity progressively exhibits lower orders of reflection coefficient until the terminal impedance matches that of the line and all the power is absorbed at the termination. Between these two limits, a relation between resistivity and reflection coefficient exists. A return loss in decibels equals twenty times the log to the base 10 of the reflection coefficient.

Measurement of the return loss of the sample is made by comparing it with a "perfect" conductor. The test sample is first positioned to terminate the wave guide at 18. Calibrated attenuators 20 and 26 are set at zero and balance attenuators 22 and 24 are adjusted for equal amplitude of signals in monitor circuits 16 and 17 as indicated on the oscilloscope. The test sample is then removed and a good conductor such as brass or aluminum inserted in test position 18. A rise in the reflected signal will occur due to the increased reflection from the less resistive material. Attenuator 26 is then adjusted until the input, or incident, and reflected, or echo, signals are again equal on the oscilloscope. The return loss in decibels may then be read from attenuator 26 and resistivity determined by calculation or by reference to a graph such as FIG. 4.

It may be desired to measure a smaller area of sample at the same frequency and with substantially the same equipment. This can be done by masking off a part of the wave guide opening with a good conducting surface such as gold plated brass or by using a tapered transition section to a smaller terminal area. In these situations, graphs for the particular configuration can be constructed by using samples of known resistivities and determining their losses in the specific apparatus. The advantage of being able to handle new test requirements more or less empirically in this way without recourse to complicated theoretical analysis is apparent.

Figure 4:
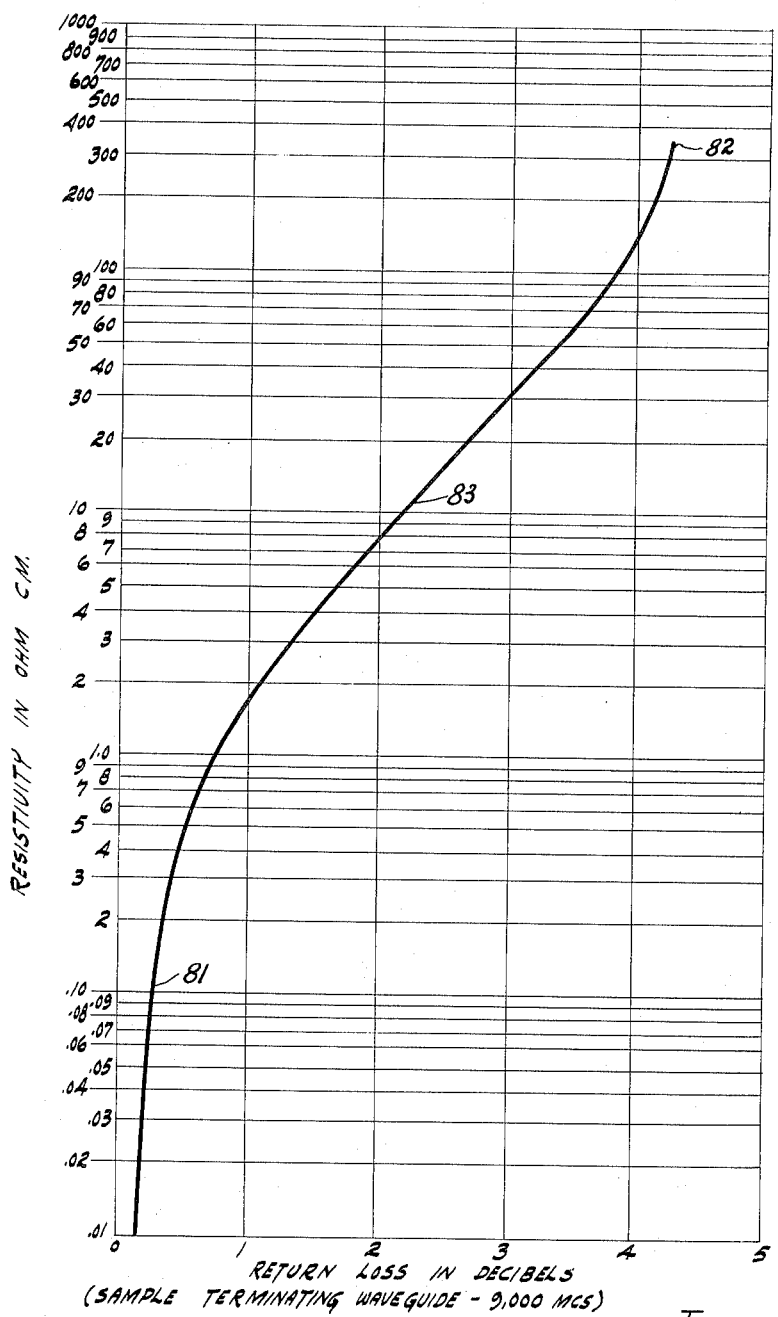

FIG. 4 shows graphically the relationship between resistivity and return loss for a silicon sample tested as described above at 9,000 megacycles. The sample thickness in this case exceeded the penetration depth of the signal although it is possible, as will be shown below, to measure material of a lesser thickness. It is seen that a portion 81 of the curve between approximately 0.01 and 4.0 ohm-centimeters has a large slope with very small increments of return loss per change in magnitude. These are difficult to measure on commercial attenuators. A similar situation begins at the higher resistivity range 82 where the large impedances of the sample approach the characteristic impedance of the transmission line. It appears, then, that this particular test frequency is most advantageous for the range of resistivities in the central portion 83 of the curve.

Figure 2:
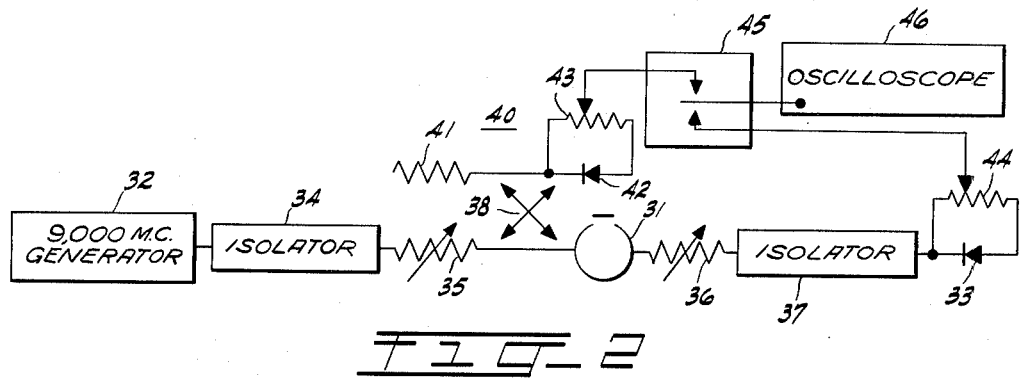
FIG. 2 is a circuit diagram of an inventive embodiment in which the test sample is incorporated in a resonant cavity portion of a transmission line.

A greater range of resistivities can be measured at the same test frequency with the apparatus of FIG. 2 according to the invention. In this apparatus, a high Q resonant cavity 31 lightly couples a signal generator 32 to a crystal detector load 33. Isolator 34 and attenuator 35 are connected in series between generator 32 and cavity 31, and calibrated attenuator 36 and isolator 37 are connected in series between the cavity output and the load crystal 33. The isolators 34 and 37 serve to prevent feedback into the generator and cavity respectively of reflections while the attenuators function as described below.

Directional coupler 38, a hybrid junction, couples the input of cavity 31 to monitor circuit 40. Circuit 40 comprises balance impedance 41 on one side of the coupler and diode detector 42 on the other side. Potentiometers 43 and 44 are in parallel with diodes 42 and 33 respectively to balance out differences in the diode operating characteristics. The outputs of potentiometers 43 and 44 are led to switch 45 which alternately applies them to oscilloscope 46.

Figure 3:
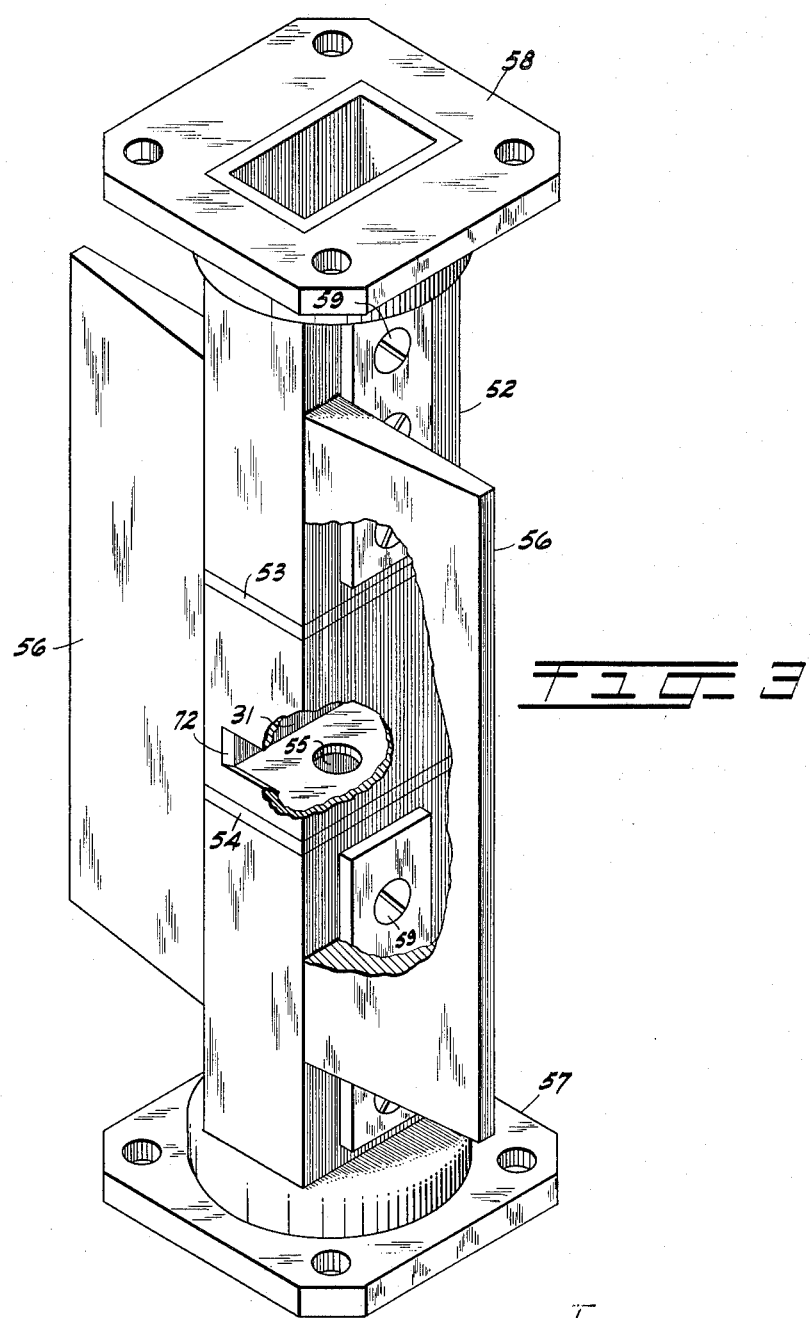
FIG. 3 is a perspective partially broken away view of a cavity according to the invention.

FIG. 3 shows one construction of the resonant cavity for a system using a 9,000 megacycle signal frequency. The cavity 31 is a section of a wave guide 52 which is bounded in cross-section by two brass plates 53 and 54 spaced one half of a wave length apart. Apertures 55 about 3/16 inch in diameter in each of plates 53 and 54 couple the cavity to the other portions of the wave guide. In the smaller dimension of the external walls, an opening 72, 0.220 x 0.400 inch is made for the test samples. As is readily seen from the drawing the opening 72 is substantially smaller than one-half wave length along the direction of wave propagation and is located at a point of substantially uniform and high current density. Wings 56 serve as structural support and also to support the test sample inserted in or covering hole 72. Tuning screws 59 provide an adjustment of the transition impedance between the wave guide and the cavity.

The signal transmitted between wave guide couplings 57 and 58 is proportional to the Q of the cavity 31. Variation of the Q is accomplished by using some of the material to be tested for resistivity as a portion of the resonant cavity wall. Measurements of the difference in transmitted signal level between a good conductor such as gold plated brass and a sample of reduced conductivity are related to resistivity as shown in the curves of FIG. 5.

The set of FIG. 2 is operated as follows. A high conductivity reference plate which may be of gold plated brass is inserted in the test sample hole of cavity 31. The frequency of signal generator 32 is adjusted to the resonant frequency of the cavity 31 as indicated by a maximum signal on oscilloscope 46. Attenuation is then inserted in the cavity circuit with attenuator 36, in excess of the attenuation which would cause the same signal reduction as the cavity loaded with the test sample. Balance potentiometers 43 and 44 are adjusted until the input signal passing through circuit 40 and the cavity signal trace have the same value. The set is now calibrated and the reference plate is removed from the cavity and the test sample inserted. Attenuator 36 is adjusted to bring the two signals to the same level. The amount of attenuation removed from the circuit is the transmission loss. Expressed another way, the difference after calibration of the settings of attenuator 36 with the cavity loaded first by the highly conductive reference plate and then by the test sample is the change in transmission loss. The relationship of this loss change to resistivity for a 9,000 megacycle test is shown by FIG. 5 curve 62. For the curve the sample thicknesses greatly exceeded the penetration depth of the signal.

It may be desired to test the resistivity of samples having a thickness less than the penetration of the signal. Loss of signal through the sample can be avoided by backing it with highly conductive material. The results of this method are shown in FIG. 5 curves 63 and 64. Curve 63 is for a sample 0.006 inch thick while curve 64 is for a sample 0.018 inch thick; both samples were backed with brass. When the thickness of the samples is not known, so that uncertainty exists as to whether or not the signal completely penetrates the sample, it is evident from curves 63 and 64 that an ambiguity exists. For example, if the transmission loss is found to be 4 decibles, the point 67 for the thick slice gives a 0.035 ohm-centimeter resistivity while the point 68 gives a 7.3 ohm-centimeter resistivity. It has been determined that this ambiguity can be avoided by testing all samples first with a high resistivity material and then without the backing. If a change in loss occurs, the sample is less thick than the penetration depth and the thickness is measured so that the proper curve can be consulted. Curves 65 and 66 illustrate the results of this method. Curve 65 is for an 0.006 inch thick sample material while curve 66 is for an 0.018 inch thick sample; both samples were backed wtih 100 ohm-centimeter material and the curves are unambiguous.

It is also possible when all of the samples are known to be within a given range, for example, 0.006±10% inch, to avoid a thickness measurement entirely. This occurs when the permissible deviation from the true resistivity, say ±1% ohm-cm., is more than the difference in resistivity between a curve for a 0.006 inch and curves for 0.006±10% inch plus the error inherent in the measurement. The curve for 0.006 inch would then be consulted for every sample without measuring the thickness and the resistivity would always be within the allowable error. The sample thickness range which can be handled in this way increases as the resistivity diminishes.

It is to be understod that the above described arrangements and methods are merely illustrative of the principles and application of the invention. Other arrangements may be devised by those skilled in the art which incorporate the essence of the invention and fall within its spirit and scope.

What is claimed is:

1. A method of determining the resistivity of semiconductor materials using a high frequency test signal which comprises the steps of applying a high frequency signal to a high Q resonant cavity having walls substantially of a conductive material forming an aperture therein at a point of substantially uniform and high current density, placing a sample of semiconductor material over the aperture, measuring the transmission loss through the cavity, and determining from known resistivity versus loss characteristics the resistivity of the semiconductor sample.

2. A method of determining the resistivity of semiconductor materials using a high frequency test signal in which the thickness of a test sample of the material may be less than, equal to, or greater than the capability of the signal to penetrate the material which comprises the steps of providing a transmission path for the signal including a high Q resonant cavity having walls substantially of a conductive material forming an aperture therein, backing the test sample with a piece of high resistivity material having a thickness such that the sum of the thicknesses of the test sample and the backing material exceeds the penetration capability of the signal through the backed test sample, introducing the backed sample in the transmission path aperture, and measuring the transmission loss through the cavity.

3. Apparatus for determining the resistivities of semiconductor material which comprises in combination a high frequency signal source, a high Q resonant cavity, and a load, the cavity loosely coupling the source to the load, the cavity having walls forming an aperture therein at a point of substantially uniform and high current density, the aperture being substantially smaller than one-half wave length along the direction of wave propagation, and means for supporting at least a portion of a semiconductor sample under test in the aperture as a continuation of the walls.

4. Apparatus according to claim 3, characterized by a directional coupler intermediate the source and the cavity, a first circuit including a balancing impedance and a first detector being coupled to the directional coupler so that the signal from the source appears therein, a high frequency current measuring instrument serially connected to the first detector, the load being an attenuator and a second detector in series, and a high frequency current measuring instrument connected to the load.

5. Apparatus according to claim 3 which further comprises a directional coupling intermediate the source and the cavity, a first circuit having a detector and first potentiometer in parallel coupled to the directional coupler so that the input signal to the cavity also appears in the first circuit, the load including a variable attenuator in series with a parallel detector and second potentiometer, and switching means in series with a high frequency current measuring instrument for alternately connecting the first and second potentiometers to the instrument.

6. Apparatus for determining the resistivity of a material comprising a first rectangular wave guide, a second rectangular wave guide, a high Q resonant cavity of rectangular configuration intermediate the wave guides, the wave guides and the cavity having corresponding wide and narrow walls, one of the narrow walls of the cavity defining a slot adapted to receive the material in such manner that a face of the material defines a relatively small portion of the total wall area of the interior of the cavity, means for applying wave energy to the first wave guide, and means for measuring the wave energy passed through the cavity to the second wave guide.

References Cited by the Examiner

UNITED STATES PATENTS

| | | | |
|---|---|---|---|
| 2,575,799 | 11/51 | Doherty et al. | 324—58 |
| 2,602,828 | 7/52 | Norton | 324—58 X |
| 2,611,804 | 9/52 | Zaleski | 324—58.5 |
| 2,613,251 | 10/52 | Ebert | 324—58 |
| 2,649,570 | 8/53 | Radcliffe | 324—58 X |
| 2,798,197 | 7/57 | Thurston | 324—58.5 |
| 2,817,813 | 12/57 | Rowen et al. | 324—58.5 |

(Other references on following page)

OTHER REFERENCES

Beck: "Conductivity Measurements at Microwave Frequencies," Bell Laboratories Record, vol. XXVIII, No. 10, October 1950, pp. 433–437.

"Conductivity of Metallic Surfaces at Microwave Frequencies," article in Journal of Applied Physics (I), vol. 18, July 1947, pp. 629–638.

"Effect of Neutral Impurity on the Microwave Conductivity and Dielectric Constant of Germanium at Low Temperatures," article in Physical Review, vol. 103, pp. 1671–1674, September 1956.

Harris et al.: "Measurement of High Permitivity Dielectrics at Microwave Frequencies," Review of Scientific Instruments, vol. 26, No. 5, May 1955, pp. 482–485.

Y. Nishina and W. J. Spry, article in Journal of Applied Physics (II), vol. 29, 1958, page 230.

Surber, Jr., et al.: "Dielectric Measurement Methods for Solids at Microwave Frequencies," Journal of Applied Physics, vol. 19, December 1948, pp. 1130–1139.

Thorp: "RF Conductivity in Copper at 8 mm. Wavelengths," Proceedings of I.E.E., vol. 101, part III, No. 74, November 1954, pp. 357–359.

WALTER L. CARLSON, *Primary Examiner.*

LLOYD McCOLLUM, *Examiner.*